(12) United States Patent
Shahar et al.

(10) Patent No.: US 11,966,355 B2
(45) Date of Patent: Apr. 23, 2024

(54) NETWORK ADAPTER WITH A COMMON QUEUE FOR BOTH NETWORKING AND DATA MANIPULATION WORK REQUESTS

(71) Applicant: Mellanox Technologies, Ltd., Yokneam (IL)

(72) Inventors: Ariel Shahar, Jerusalem (IL); Roee Moyal, Yokneam Illit (IL); Ali Ayoub, Karmiel (IL); Michael Kagan, Zichron Yaakov (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 538 days.

(21) Appl. No.: 16/224,834

(22) Filed: Dec. 19, 2018

(65) Prior Publication Data

US 2019/0171612 A1  Jun. 6, 2019

Related U.S. Application Data

(63) Continuation-in-part of application No. 13/792,083, filed on Mar. 10, 2013, now Pat. No. 10,275,375.

(51) Int. Cl.
*G06F 15/173* (2006.01)
*G06F 13/28* (2006.01)
(Continued)

(52) U.S. Cl.
CPC ........ *G06F 15/17331* (2013.01); *G06F 13/28* (2013.01); *G06F 15/167* (2013.01);
(Continued)

(58) Field of Classification Search
CPC .. G06F 15/17331; G06F 13/28; G06F 15/167; G06F 15/1735; G06F 11/108; G06F 11/362; G06F 12/0246; G06F 12/08; G06F 12/0802; G06F 12/0804; G06F 12/0868; G06F 12/12; G06F 12/121; G06F 12/123;
(Continued)

(56) References Cited

U.S. PATENT DOCUMENTS 7,181,541 B1 * 2/2007 Burton .................... H04L 49/90
370/463
7,342,934 B1 * 3/2008 Mott ..................... H04L 49/901
370/392

(Continued)

*Primary Examiner* — Greg C Bengzon
(74) *Attorney, Agent, or Firm* — KLIGLER & ASSOCIATES PATENT ATTORNEYS LTD.

(57) ABSTRACT

A network adapter includes a network interface that communicates packets over a network, a host interface connected locally to a host processor and to a host memory, and processing circuitry, coupled between the network interface and the host interface, and is configured to receive in a common queue, via the host interface, (i) a processing work item specifying a source buffer in the host memory, a data processing operation, and a first address in the host memory, and (ii) an RDMA write work item specifying the first address, and a second address in a remote memory. In response to the processing work item, the processing circuitry reads data from the source buffer, applies the data processing operation, and stores the processed data in the first address. In response to the RDMA write work item the processing circuitry transmits the processed data, over the network, for storage in the second address.

27 Claims, 3 Drawing Sheets

(51) Int. Cl.
*G06F 15/167* (2006.01)
*H04L 9/06* (2006.01)
*H04L 9/32* (2006.01)

(52) U.S. Cl.
CPC ........ *G06F 15/1735* (2013.01); *H04L 9/0631* (2013.01); *H04L 9/0643* (2013.01); *H04L 9/3247* (2013.01)

(58) Field of Classification Search
CPC .. G06F 13/122; G06F 13/385; G06F 13/4022; G06F 13/4059; G06F 13/426; G06F 19/3418; G06F 1/183; G06F 3/0604; G06F 3/0608; G06F 3/0613; G06F 3/0619; G06F 3/0643; G06F 3/065; G06F 3/0652; G06F 3/0656; G06F 3/0659; G06F 3/0679; G06F 3/0685; G06F 3/0688; G06F 9/52; G06F 9/54; G06F 13/4282; G06F 21/44; G06F 21/79; G06F 21/80; G06F 3/061; G06F 3/0611; G06F 3/0655; G06F 3/0683; H04L 9/0631; H04L 9/0643; H04L 9/3247; H04L 67/1097; H04L 67/02; H04L 69/04; H04L 69/16; H04L 69/161; H04L 12/40032; H04L 12/413; H04L 29/06; H04L 47/10; H04L 49/90; H04L 49/901; H04L 49/9047; H04L 49/9057; H04L 63/0485; H04L 63/164; H04L 63/20; H04L 67/06; H04L 67/2828; H04L 67/2876; H04L 69/12; H04L 69/24; H04L 69/32; H04L 69/324; H04L 49/9094; H04L 67/10; H04L 69/166; A61B 8/00; A61B 8/44; A61B 8/4411; A61B 8/463; A61B 8/56; G16H 30/20; G16H 40/67; H03M 7/30; H03M 7/3084; H04N 19/503; H04N 19/587; H04N 19/59; H04N 19/593; H04N 19/597; H04N 21/222; H04N 21/23103; H04N 21/232; H04N 21/6581; H04N 21/8456; H05K 7/1444; H05K 7/1487

See application file for complete search history.

(56) References Cited

U.S. PATENT DOCUMENTS

| | | | | |
|---|---|---|---|---|
| 7,451,197 B2* | 11/2008 | Davis | H04L 69/16 | 709/220 |
| 7,688,838 B1* | 3/2010 | Aloni | G06F 13/128 | 370/412 |
| 7,835,380 B1* | 11/2010 | Aloni | H04L 12/413 | 370/419 |
| 8,233,380 B2* | 7/2012 | Subramanian | H04L 47/10 | 370/218 |
| 8,489,778 B2* | 7/2013 | Sharp | G06F 13/385 | 710/8 |
| 8,635,353 B2* | 1/2014 | Pope | H04L 49/901 | 709/230 |
| 10,275,375 B2* | 4/2019 | Ayoub | G06F 13/28 | |
| 2002/0141424 A1* | 10/2002 | Gasbarro | H04L 49/358 | 370/412 |
| 2002/0152327 A1* | 10/2002 | Kagan | H04L 49/90 | 709/250 |
| 2003/0014544 A1* | 1/2003 | Pettey | H04L 69/169 | 709/249 |
| 2004/0049774 A1* | 3/2004 | Boyd | H04L 69/166 | 719/312 |
| 2004/0093389 A1* | 5/2004 | Mohamed | H04L 67/1097 | 709/212 |
| 2005/0080869 A1* | 4/2005 | Bender | H04L 45/28 | 709/212 |
| 2005/0091383 A1* | 4/2005 | Bender | H04L 67/1097 | 709/228 |
| 2005/0120360 A1* | 6/2005 | Makhervaks | H04L 67/1097 | 719/321 |
| 2006/0227799 A1* | 10/2006 | Lee | H04L 49/90 | 370/429 |
| 2007/0165672 A1* | 7/2007 | Keels | H04L 1/0083 | 370/474 |
| 2007/0208820 A1* | 9/2007 | Makhervaks | H04L 67/10 | 709/212 |
| 2007/0226750 A1* | 9/2007 | Sharp | H04L 67/1097 | 719/313 |
| 2008/0043750 A1* | 2/2008 | Keels | H04L 49/9094 | 370/395.52 |
| 2008/0140724 A1* | 6/2008 | Flynn | G06F 11/108 | |
| 2008/0147822 A1* | 6/2008 | Benhase | G06F 9/546 | 709/217 |
| 2009/0106771 A1* | 4/2009 | Benner | G06F 12/1466 | 719/313 |
| 2009/0150605 A1* | 6/2009 | Flynn | G06F 12/0246 | 711/112 |
| 2009/0150641 A1* | 6/2009 | Flynn | G06F 12/1018 | 711/202 |
| 2009/0222596 A1* | 9/2009 | Flynn | G06F 3/0643 | 710/22 |
| 2010/0146068 A1* | 6/2010 | Haviv | G06F 3/0613 | 709/212 |
| 2011/0296133 A1* | 12/2011 | Flynn | G06F 3/0619 | 711/171 |
| 2012/0030408 A1* | 2/2012 | Flynn | G06F 3/0688 | 711/102 |
| 2012/0079175 A1* | 3/2012 | Flynn | G11C 7/1012 | 711/103 |
| 2012/0131124 A1* | 5/2012 | Frey | H04L 67/1097 | 709/212 |
| 2012/0254480 A1* | 10/2012 | Tamir | G06F 13/385 | 710/22 |
| 2013/0054726 A1* | 2/2013 | Bugge | G06F 9/52 | 709/212 |
| 2013/0086582 A1* | 4/2013 | Cardona | G06F 9/45558 | 718/1 |
| 2013/0198311 A1* | 8/2013 | Tamir | G06F 3/061 | 709/212 |
| 2019/0205244 A1* | 7/2019 | Smith | G06F 12/12 | |

* cited by examiner

NETWORK ADAPTER WITH A COMMON QUEUE FOR BOTH NETWORKING AND DATA MANIPULATION WORK REQUESTS

CROSS-REFERENCE TO RELATED APPLICATIONS

This application is a continuation in part of U.S. patent application Ser. No. 13/792,083, filed Mar. 10, 2013, whose disclosure is incorporated herein by reference.

FIELD OF THE INVENTION

The present invention relates generally to computer networks, and particularly to network adapters in which both networking work requests and data manipulation work requests are queued in a common work queue.

BACKGROUND

Switched-fabric communication architectures are widely used in high-performance computing. Examples of such architectures include InfiniBand™ and high-speed Ethernet™. Computing devices (host processors and peripherals) connect to the switched fabric via a network adapter such as an interface controller (NIC), which is referred to in InfiniBand (IB) parlance as a channel adapter. Host processors (or hosts) use a host channel adapter (HCA), while peripheral devices use a target channel adapter (TCA). Some of the embodiments in the description that follows are based on features of the IB architecture and use vocabulary taken from IB specifications. Similar mechanisms exist in networks and input/output (I/O) devices that operate in accordance with other protocols, such as Ethernet and Fibre Channel, however, and IB terminology and features are used herein by way of example, for the sake of convenience and clarity, and not by way of limitation.

Client processes (referred to hereinafter as clients), such as software application processes, running on a host processor communicate with the transport layer of an IB fabric by manipulating a transport service instance, known as a "queue pair" (QP). Each QP is made up of a send work queue and a receive work queue. To send and receive messages over the network using a HCA, the client submits work items, called work queue elements (WQEs), for execution by the HCA. (More precisely, the client initiates work requests (WRs), which cause WQEs to be placed in the appropriate work queues.) After it has finished servicing a WQE, the HCA typically writes a completion report, in the form of a completion queue element (CQE), to a completion queue (CQ), to be read by the client as an indication that the work request has been executed.

Remote direct memory access (RDMA) protocols enable a NIC to carry out direct memory access operations over a network from the memory of one computer to another without directly involving the computer operating systems. For example, in order to generate an RDMA write command, the client posts a work request to the NIC that results in placing a suitable WQE in a work queue of the NIC. This WQE specifies a source buffer in the local host memory and instructs the NIC to transfer the data in the buffer, via one or more packets sent over the network, to a target address in the host memory of a (remote) target node. The NIC at the target node receives the packets and writes the data to the target address. In similar fashion, a WQE for performing an RDMA read command specifies a source buffer in a remote node and a target address in the local host memory. The RDMA read command causes the NIC to request the data in the remote source buffer and then, upon receiving the data from the remote node, to write the data to the target address in the local host memory specified in the WQE.

In IB networks, RDMA read and write operations are an integral part of the transport-layer protocol. These operations provide high-throughput, low-latency data transfers, which are carried out by the HCA under application-level control. RDMA over Converged Ethernet (RoCE) and the Internet Wide Area RDMA Protocol (iWARP) offer similar capabilities over an Ethernet network.

SUMMARY

An embodiment that is described herein provides a network adapter, including a network interface, a host interface, and processing circuitry. The network interface is configured to transmit and receive data packets over a network. The a host interface is configured to be connected via a local bus to a host processor and to a local host memory of the host processor. The processing circuitry is coupled between the network interface and the host interface and is configured to receive in a common work queue, via the host interface, (i) a data processing work item specifying a source buffer in the local host memory, a data processing operation, and a first target address in the local host memory, and (ii) an RDMA write work item specifying the first target address and a second target address in a remote memory. In response to the data processing work item, the processing circuitry is configured to read data to be processed from the specified source buffer, produce processed data by applying the specified data processing operation to the data read, and store the processed data in the first target address. In response to the RDMA write work item, the processing circuitry is configured to transmit the processed data in the first target address, via the network interface over the network, for storage in the second target address of the remote memory.

In some embodiments, the processing circuitry is configured to execute the RDMA write work item only in response to completing execution of the data processing work item. In other embodiments, the processing circuitry is configured to receive a second data processing work item specifying a second data processing operation, before receiving the RDMA write work item, and to execute the RDMA write work item after executing both the data processing work item and the second data processing work item. In yet other embodiments, the second data processing work item specifies the first target address as input for applying the second data processing operation, and in response to the second data processing work item, the processing circuitry is configured to apply the second data processing operation to the processed data in the first target address.

In an embodiment, the second data processing work item specifies a second source buffer, different from the source buffer, to which to apply the second data processing operation. In another embodiment, the data processing operation is selected from a list of operations including: data encryption, data decryption, digital signing of data, data verification using a digital signature, data compression, data decompression, an image processing operation, and a match operation for a regular expression. In yet another embodiment, the processing circuitry is configured to receive in the common work queue a sequence of one or more work items specifying respective data processing operations and respective source and target addresses in the local memory, the target address specified in each work item is also specified as the source address in a subsequent work item in the sequence, and the processing circuitry is configured to perform the data processing operations by orderly executing the work items in the sequence.

There is additionally provided, in accordance with an embodiment that is described herein, a method, including, in a network adapter that transmits and receives data packets over a network, and that connects via a local bus to a host processor and to a local host memory of the host processor, receiving in a common work queue (i) a data processing work item specifying a source buffer in the local host memory, a data processing operation, and a first target address in the local host memory, and (ii) an RDMA write work item specifying the first target address and a second target address in a remote memory. In response to the data processing work item, data to be processed is read from the specified source buffer, processed data is produced by applying the specified data processing operation to the data read, and the processed data is stored in the first target address. In response to the RDMA write work item, the processed data in the first target address is transmitted, over the network, for storage in the second target address of the remote memory.

There is additionally provided, in accordance with an embodiment that is described herein, a network adapter that includes a network interface, a host interface, and processing circuitry. The network interface is configured to transmit and receive data packets over a network. The host interface is configured to be connected via a local bus to a host processor and to a local host memory of the host processor. The processing circuitry, which is coupled between the network interface and the host interface and is configured to receive in a common work queue, via the host interface, (i) an RDMA read work item specifying a source buffer in a remote memory and a first target address in the local host memory, and (ii) a data processing work item specifying the first target, a data processing operation, and a second target address in the local host memory. In response to the RDMA read work item, the processing circuitry is configured to receive data to be processed from the source buffer, via the network interface over the network, and store the received data in the first target address of the local memory. In response to the data processing work item, the processing circuitry is configured to read data to be processed from the first target address, produce processed data by applying the specified data processing operation to the data read, and store the processed data in the second target address in the local host memory.

In some embodiments, the processing circuitry is configured to execute the data processing work item only in response to completing execution of the RDMA read work item. In other embodiments, the processing circuitry is configured to receive a second data processing work item specifying a second data processing operation, after receiving the RDMA read work item, and to execute both the data processing work item and the second data processing work item after executing the RDMA read work item. In yet other embodiments, the second data processing work item specifies the second target address as a source buffer for applying the second data processing operation, and in response to the second data processing work item, the processing circuitry is configured to apply the second data processing operation to the processed data in the second target address.

In an embodiment, the second data processing work item specifies a second source buffer, different from the second target address, to which to apply the second data processing operation. In another embodiment, the data processing operation is selected from a list of operations including: data encryption, data decryption, digital signing of data, data verification using a digital signature, data compression, data decompression, an image processing operation, and a match operation for a regular expression.

There is additionally provided, in accordance with an embodiment that is described herein, a method, including, in a network adapter that transmits and receives data packets over a network, and that connects via a local bus to a host processor and to a local host memory of the host processor, receiving in a common work queue, (i) an RDMA read work item specifying a source buffer in a remote memory and a first target address in the local host memory, and (ii) a data processing work item specifying the first target, a data processing operation, and a second target address in the local host memory. In response to the RDMA read work item, data to be processed is received from the source buffer in the remote memory, over the network, and the received data is stored in the first target address of the local memory. In response to the data processing work item, data to be processed is read from the first target address, processed data is produced by applying the specified data processing operation to the data read, and the processed data is stored in the second target address in the local host memory.

The present invention will be more fully understood from the following detailed description of the embodiments thereof, taken together with the drawings in which:

DETAILED DESCRIPTION OF EMBODIMENTS

Overview

In many situations, data needs to be processed for various purposes, for example, prior to or after performing data transmission over a network. Data processing may be required for bandwidth conservation, security purposes and the like.

Embodiments of the present invention that are described hereinbelow provide a NIC in which Work Queues support concurrent queueing of different types of work requests, such as remote communication and data processing work requests. The work requests may be invoked by a client process running on the host processor. In the description that follows the terms "network adapter" and "NIC" are used interchangeably. The term "remote communication" refers to herein as a data transfer operation from one host to another over a network. In the description that follows, the term "WQE" refers to a work item placed in a work queue in response to a respective "work request" from the host. For convenience, the terms "WQE" and "work request" are used hereinbelow interchangeably.

In principle, a host processor could post work requests specifying data processing operations to dedicated work queues separately from the work queues used by the NIC for queueing remote communication work requests. This, however, would involve the host processor, for example, when performing a combined operation that requires both data manipulation and remote communication. Such involvement of the host processor requires valuable processing cycles and memory bandwidth, and introduces long latencies. Moreover, when the host processor handles data processing work requests in dedicated queues and remote communication work requests in other queues, bottlenecks and non-deterministic performance of multiple applications may occur.

Data processing operations such as, for example, data encryption, data authentication and data compression, are typically computation-intensive tasks, which consume considerable processing resources when carried out in software. Although dedicated hardware-based compression co-processors are known in the art, they are not available in most servers.

In some embodiments, the NIC handles work requests of different types that are posted to a common work queue. For example, the host processor posts to the common work queue both data processing work requests and remote communication work requests. Using such a common work queue allows efficient execution of a combined operation that comprises multiple sub-operations, without involving the host processor between the sub-operations.

To perform a combined operation comprising a data processing sub-operation followed by an RDMA write sub-operation, the host processor first posts to the common work queue a suitable data processing WQE and then a corresponding RDMA write WQE. The data processing WQE specifies a source buffer in the local host memory, the requested data processing operation, and a first target address in the local host memory, serving as an intermediate buffer in this case. The RDMA write WQE specifies the first target address as an input buffer, and a second target address in a remote memory as an output buffer. In response to the data processing WQE, the NIC reads the data to be processed from the specified source buffer, applies the specified data processing operation to the data read, and stores the processed data in the first target address. In response to the RDMA write WQE, the NIC transmits the processed data in the first target address, over the network, for storage in the second target address of the remote memory.

Similarly, to perform a combined operation comprising an RDMA read sub-operation followed by a data processing sub-operation, the host processor first posts to the common work queue an RDMA read WQE and then a corresponding data processing WQE. The RDMA read WQE specifies a source buffer in a remote memory and a first target address in the local host memory, serving as an intermediate buffer. The data processing WQE specifies the first target as an input buffer, the requested data processing operation, and a second target address in the local host memory as an output buffer. In response to the RDMA read WQE, the NIC receives data to be processed from the source buffer, over the network, and stores the received data in the first target address of the local memory. In response to the data processing WQE, the NIC reads data to be processed from the first target address, applies the specified data processing operation to the data read, and stores the processed data in the second target address in the local host memory.

In some embodiments, the NIC supports various types of data processing operations such as, for example, data encryption, data decryption, digital signing of data, data verification using a digital signature, data compression, data decompression, an image processing operation, and a match operation for a regular expression. Any other suitable data processing operation can also be used.

In some embodiments, a combined operation comprises a chain of one or more data processing sub-operations posted by the host in multiple respective WQEs to multiple entries in the common work queue. The sub-operations comprising the combined operation are linked by having each WQE in the chain specifying as an input buffer the output buffer of its predecessor WQE in the chain. In some embodiments the chain of multiple data processing sub-operations additionally includes a leading RDMA read operation or a terminating RDMA write operation. The NIC executes the sequence of WQEs in the chain before involving the host processor. In some embodiments, the NIC executes the data processing operations using a local hardware accelerator.

In some embodiments, e.g., in case of a single data processing operation, a combined operation comprising a remote communication sub-operation and a data processing sub-operation is performed by the NIC as "zero-copy" operations, i.e., on the fly, without storing the data in any intermediate memory buffer.

By using the disclosed techniques, the host processor is able to offload not only communication tasks, but also data processing tasks, to the NIC. In a typical model of use that combines these remote communication and data processing commands, a combined data processing process and RDMA write operation specifies that the processed data is to be written via the network to a target address on a remote node. NICs in accordance with embodiments of the present invention are particularly useful in applications that are communication- and processing-intensive.

System Description

Figure 1:
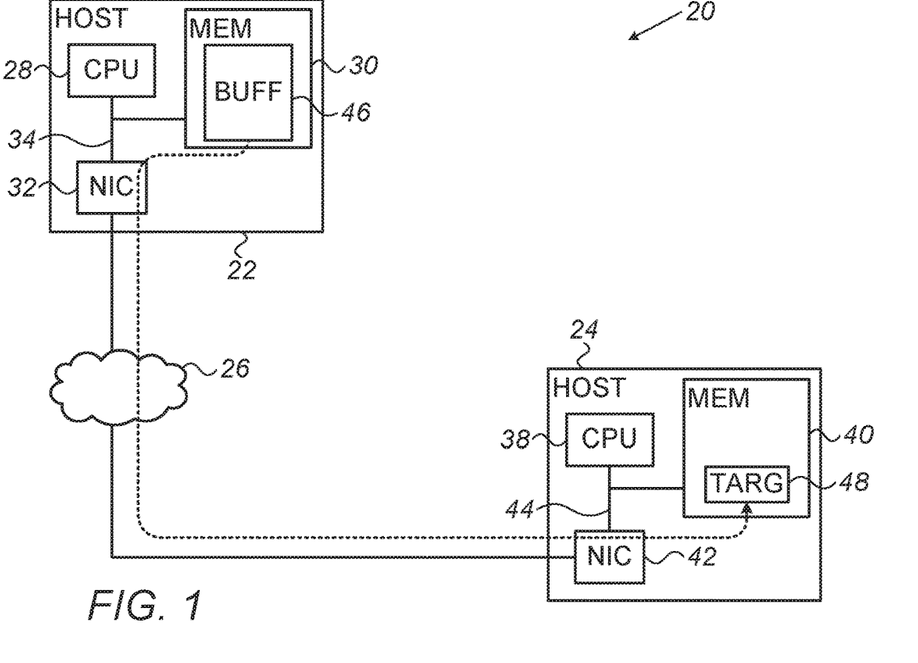
FIG. 1 is a block diagram that schematically illustrates a network communication system, in accordance with an embodiment of the present invention.

FIG. 1 is a block diagram that schematically illustrates a network communication system 20, in accordance with an embodiment of the present invention. A host computer 22 (also referred to as a host, a host device) communicates with another host computer 24 via a network 26, such as an IB or Ethernet switch fabric in the present example. Host computers 22 and 24 can also be seen as nodes on network 26. Host computer 22 comprises a central processing unit (CPU) 28 (also referred to simply as a processor) and a system memory 30 (also referred to as a local host memory), which are connected by a suitable local bus 34. A NIC 32, such as an HCA, connects host computer 22 to network 26 (although as noted earlier and explained further hereinbelow, the NIC may also be used for local data processing operations). NIC 32 is connected to the other components of host computer 22 by local bus 34, which may be a peripheral connection bus, such as a PCI Express™ (PCIe) bus, or it may be an internal system bus of CPU 28, depending on the architecture of the computer. Similarly, host computer 24 comprises a CPU 38, memory 40 and NIC 42, connected by a local bus 44.

In the pictured example, a client process running on CPU 28 invokes in a common work queue both remote communication commands and data processing commands for execution by NIC 32. Specifically, assuming NIC 32 to be an IB HCA, the client process may submit suitable work requests (e.g., work requests specifying data processing commands as well as remote write or read commands) which cause corresponding WQEs to be placed in the appropriate work queue for execution by the NIC. WQEs corresponding to data processing work requests and WQEs corresponding to remote communication work requests are thus both placed in a common work queue. In NIC 32, each of the WQEs comprising the data processing work requests specify a source buffer such as buffer 46 in memory 30 containing the data to be processed, a data processing operation, and an intermediate buffer for storing the processed data in memory 30. A WQE corresponding to an RDMA write request, specifies a source buffer or the intermediate buffer in memory 30, and a target address 48 in remote memory 40.

In an alternative embodiment, the data to be processed resides in memory 40 of host computer 24, and should be read using RDMA to memory 30 via the network. A corresponding WQE in this case specifies a source buffer in remote memory 40, and a target address or an intermediate buffer in memory 30. In other alternative embodiments, data that was read from buffer 46 of memory 30 is processed by the NIC and stored in memory 30 rather than sent to host computer 24. In these alternative embodiments, the source buffer, intermediate buffer and target address should be specified in the WQEs of the work requests, accordingly.

Each RDMA write WQE and each RMDA read WQE may comprise an individual remote communication operation, or alternatively linked to one or more data processing WQEs to form a combined operation.

In the present example, when a WQE reaches the head of the work queue, NIC 32 executes the remote communication or data processing operation specified in the WQE and then proceeds to execute the next WQE. For example, in executing a combined data processing and RDMA write operation, the NIC executes the data processing WQE by reading source buffer 46, applying to the data from the buffer the specified data processing operation, and storing the processed data in the intermediate buffer specified in the WQE. The NIC then executes the RDMA write WQE by transmitting the processed data in one or more packets via network 26 to host computer 24, e.g., using RDMA. Upon receiving the packets, NIC 42 writes the processed payload data to target address 48, which is identified by information in the packet header.

As illustrated in FIG. 1, the buffer receiving the data at target address 48 may be considerably smaller than source buffer 46, for example, in case of applying data compression. (The stronger the compression, the smaller will be the target buffer.) This reduction in data size results in lower latency of data transfer, higher effective data bandwidth on the network and on the receiver bus, and smaller space consumption in memory 40 at node 24. Alternatively, depending on the data processing applied, the size of the target buffer may be same as or larger than the size of the source buffer. In some embodiments, in order to refrain from calling the CPU between the data processing operation and the transfer of the data, the NIC determines (e.g., on the fly) the amount of data to be transmitted to the remote node, which may depend on of the data processing operation applied.

Figure 2:
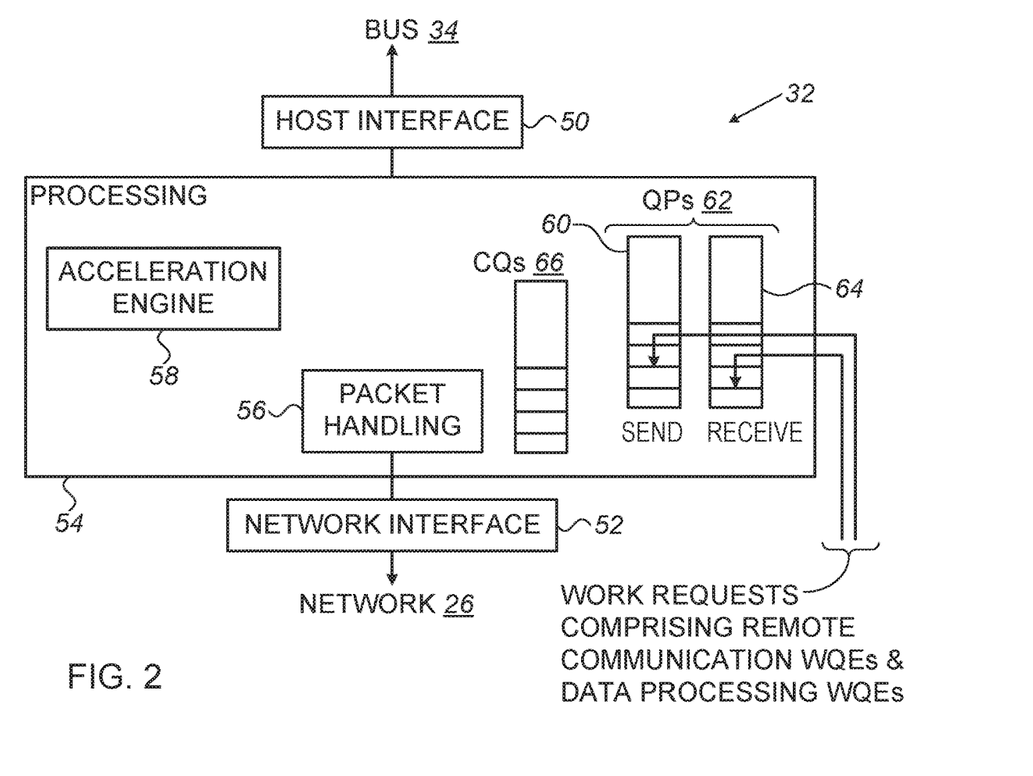
FIG. 2 is a block diagram that schematically shows elements of a NIC, in accordance with an embodiment of the present invention.

FIG. 2 is a block diagram that schematically shows elements of NIC 32, in accordance with an embodiment of the present invention. NIC 32 comprises a host interface 50, which connects to CPU 28 and to memory 30 via local bus 34, and a network interface 52, which is coupled to network 26. Processing circuitry 54, coupled between host interface 50 and network interface 52, comprises packet handling circuits 56, which generate outgoing packets for transmission over network 26 and process incoming packets received from the network. Host interface 50, network interface 52 and processing circuitry 54 typically comprise dedicated hardware logic, whose details will be apparent to those skilled in the art after reading the present description. Alternatively or additionally, at least some of the functions of processing circuitry 54 may be implemented in software on a suitable embedded processor.

NIC 32 further comprises one or more queue pairs such as QPs 62, wherein each QP comprises a send work queue 60 and a receive work queue 64. NIC 32 additionally comprises one or more completion queues CQs 66 in which the NIC may place completion queue elements (CQEs). In some embodiments, CPU 28 posts to send queue 60 both data processing WQEs and RDMA write WQEs, and to receive queue 64 both RDMA read WQEs and data processing WQEs.

When processing circuitry 54 receives work requests of data processing commands, the data processing operations specified in the respective WQEs of the work requests are carried out by an acceleration engine 58 within the processing circuitry of NIC 32. The data to be processed is read from memory 30, via host interface 50 by a suitable DMA operation over local bus 34.

In a data processing WQE, both the source buffer and the target address (or intermediate buffer) specified in the work request reside in local memory 30. As a result, both data input to acceleration engine 58 and data output from the acceleration engine take place by DMA from and to memory 30 via host interface 50.

As noted above, acceleration engine 58 typically comprises suitable hardware logic circuits for carrying out the appropriate data processing operations. The output of acceleration engine 58 may be stored in an intermediate buffer in memory 30, or alternatively, in a temporary buffer on the NIC (not shown) before being processed by a subsequent data processing operation, or transmitted to a remote node using RDMA.

The acceleration engine may comprise dedicated acceleration circuits for different types of data processing operations. The acceleration engine may be adapted for one particular method for a given type of data processing (e.g., data compression or encryption) or for two or more different methods for a given data processing operation, which may be invoked by submitting appropriate work items to the common work queue. For instance, the acceleration engine may be configured for both lossless and lossy data compression, as well as for different lossless and/or lossy data compression methods (such as Lempel-Ziv, Huffman, and predictive types of lossless algorithms). Various sorts of hardware compression and decompression accelerators are known in the art for such purposes and may be adapted for incorporation in acceleration engine 58. By way of example, U.S. Pat. No. 7,051,126 describes a compression system that includes multiple hardware compressors, which could be integrated, mutatis mutandis, into acceleration engine 58. As a another example, the acceleration engine may be configured to apply a cryptographic operation selected from a group of predefined encryption and/or authentication methods such as, for example, the advanced encryption standard (AES) encryption, the MD5 hash function, and the like. Several example data processing operations that acceleration engine 58 may support are listed further below.

NIC 32 may offer its data processing facilities to host computer 22 as part of its advertisement of overall offload capabilities. Client processes may then specify the desired data processing operations and parameters in one or more WQEs that they submit to a common work queue in the NIC (and correspondingly, the CQEs generated by the NIC may indicate what data processing operation(s) have been used). Different applications may have different data patterns, and it is thus advantageous to allow the user to choose the type of data processing operations and method of implementation supported by accelerator engine 58 that is best suited for the application data. Additionally or alternatively, the NIC may analyze the data and/or application requirements in order to choose the optimal data processing method automatically.

To summarize the main various combined operations that may be used by applying the disclosed techniques:

In a combined operation comprising a chain of one or more data processing operations followed by an RDMA write operation—the data to be processed is read from the local memory, and the processed data produced by the last data processing operation is written to a remote memory over the network using RDMA write.

In a combined operation comprising a chain of an RDMA read operation followed by one or more data processing operations—the data to be processed is received from a remote memory over the network using RDMA read, and the processed data by the last data processing operation is written to the local memory.

In a combined operation comprising a chain of one or more data processing operations—the data to be processed by the first operation in the chain is read from the local memory, and the data processed by the last operation in the chain is written to the local memory.

The configuration of communication system 20 and NIC shown in FIGS. 1 and 2 are example configurations, which are chosen purely for the sake of conceptual clarity. In alternative embodiments, any other suitable communication system and NIC configurations can be used. Some elements of NIC 32, such as packet handling circuits and acceleration engine 58, may be implemented in hardware, e.g., in one or more Application-Specific Integrated Circuits (ASICs) or Field-Programmable Gate Arrays (FPGAs). Additionally or alternatively, some NIC elements can be implemented using software, or using a combination of hardware and software elements.

In some embodiments, some of the functions of packet handling circuits 56 and/or acceleration engine 58 may be carried out by a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

In the context of the present patent application and in the claims, the term "processing circuitry" refers to all the elements of NIC 32 excluding host interface 50 and network interface 52. In FIG. 2, the processing circuitry comprises packet handling circuits 56, acceleration engine 58 work queues 60 and 64, and completion queues 66. Queues 60, 64 and 66 may be implemented in a local memory of the NIC such as a random access memory (RAM).

Methods for Executing Remote Communication and Data Processing Work Requests Posted to a Common Work Queue As noted above, the host processor may post work requests (WQEs) of multiple different types to a common work queue that is accessible by the NIC. Each WQE specifies an operation that the NIC can carry out internally. In some embodiments, the NIC executes the WQEs in the work queue sequentially in the order in which the WQEs were posted to the work queue. For example, the NIC executes a WQE, and when the operation in this WQE concludes, the NIC proceeds to execute the next WQE in the work queue. A WQE may specify an operation that is unrelated to operations specified in other WQS. Alternatively, multiple WQEs may specify a chain of linked operations that together form a combined operation. In some embodiments, a WQE comprises a flag that indicates to the NIC whether to start executing the next WQE in the queue immediately, or to wait for concluding the execution of the current WQE before proceeding to the next WQE.

A combined operation thus comprises a chain of multiple operations that should be carried out in some predefined order. Moreover, the operations in the chain are mutually linked in the sense that the data produced by one operation in the chain serves as input to the next operation in the chain.

To perform a combined operation, the host posts multiple respective WQEs that each specifies a respective operation of the chain, and these WQEs are posted in accordance with the order of operations in the combined operation. To link between the WQEs of the chain, the output buffer specified for one WQE is also specified as an input buffer for the next WQE in the chain.

In some embodiments, the WQEs of a combined operation are posted to successive entries of the work queue. In other embodiments, the multiple WQEs of a given combined operation can be interleaved in the work queue with other WQEs unrelated to the given combined operation.

Figure 3:
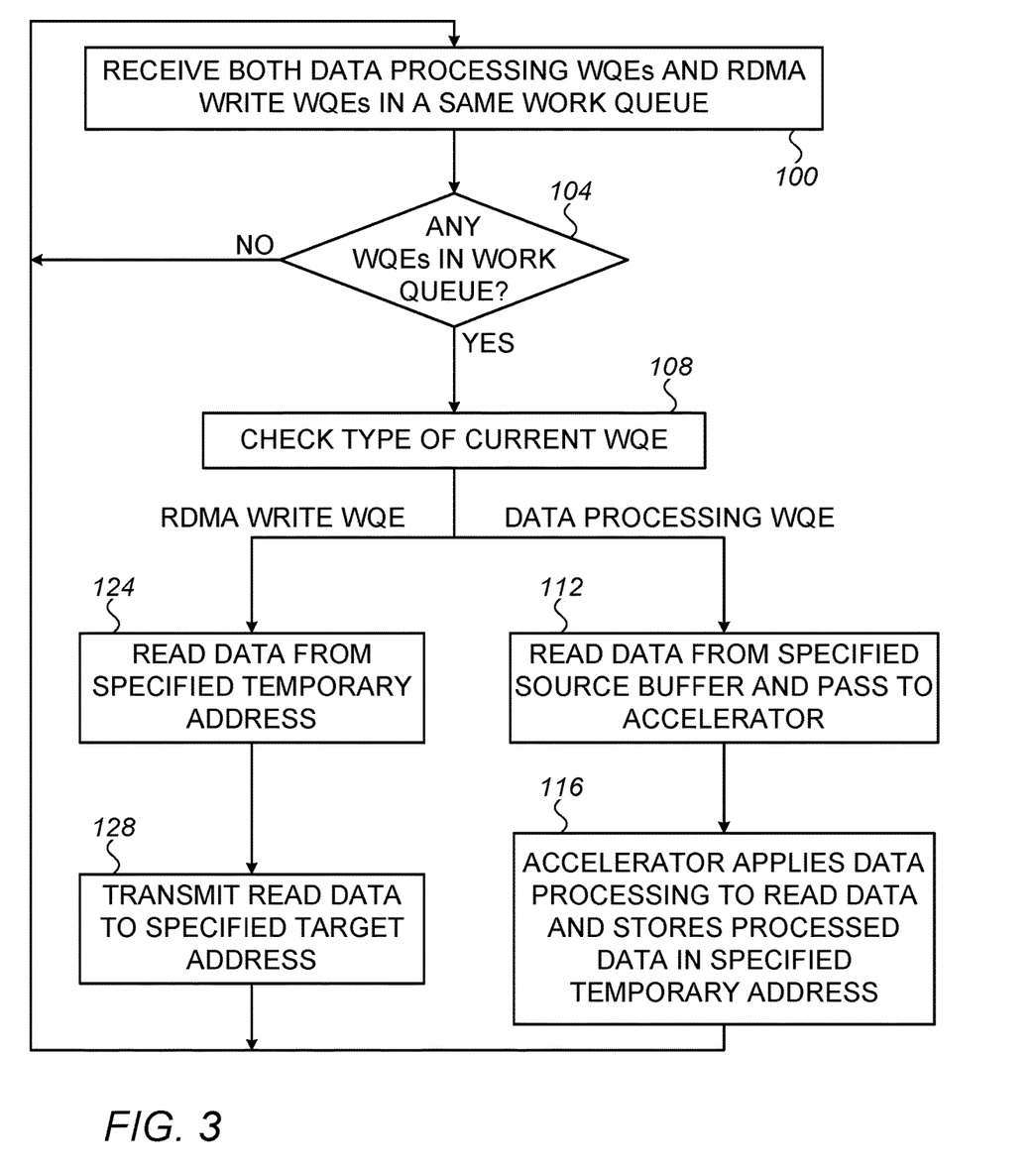
FIG. 3 is a flow chart that schematically illustrates a method for executing data processing and RDMA write work requests posted to a common work queue of a NIC, in accordance with an embodiment of the present invention.

FIG. 3 is a flow chart that schematically illustrates a method for executing data processing and RDMA write work requests posted to a common work queue of a NIC, in accordance with an embodiment of the present invention. The method is invoked when NIC 32 receives data processing work requests and/or RDMA write work requests, at a command input step 100. The work requests (WQEs) received are posted to a common work queue (e.g., send work queue 60) by the host CPU.

In an embodiment, the posted WQEs are executed by processing circuitry 54 of the NIC sequentially, in accordance with their order in the work queue. In the present example we assume that the host has posted a combined operation comprising a data processing operation followed by an RDMA write operation, by posting a data processing WQE and then a corresponding RDMA write WQE.

The data processing WQE specifies a source buffer in the local host memory, the data processing operation required, and a temporary address in the local host memory for storing the processed data. The RDMA write WQE specifies the temporary address containing the processed data, and a target address 48 in a remote memory to which the processed data is to be written. Alternatively, other suitable sorts of command formats may be used to invoke the operation, depending on the system architecture and protocols.

At a work queue polling step 104, processing circuitry 54 checks whether there are any WQEs in the work queue, and if not, loops back to step 100 to receive WQEs from the host. In alternative embodiments, step 104 is implemented by interrupting the processing circuitry when a WQE is posted to the work queue.

When at step 104 the work queue is not empty, the method proceeds to a WQE type checking step 108, for identifying whether the current WQE (e.g., at the head of the work queue) is a data processing WQE or an RDMA write WQE. It is assumed in this example that the combined operation specifies data to be conveyed, in compressed form, from local host memory 30 (of host computer 22) to remote memory 40 (of host computer 24).

It is additionally assumed that the data processing WQE was posted to the work queue before the RDMA write WQE, and is therefore executed first as described below with reference to steps 112, and 116. At a data reading step 112, the processing circuitry reads data to be processed from the source buffer in the local host memory, specified in the data processing WQE. The processing circuitry configures the accelerator engine to apply the specified data processing operation, and to direct its output to the specified temporary address, and passes the read data to acceleration engine 58 for processing.

At a processing step 116, the acceleration engine applies to the data read, the data processing operation specified in the data processing WQE. The processed data is stored in the temporary address in the local host memory.

In some embodiments, the processing circuitry waits for the accelerator engine to conclude processing at step 116, before looping back to step 100 for receiving subsequent WQEs. In other embodiments, the processing circuitry loops back to step 100 without waiting for concluding the data processing operation by the accelerator engine.

In the present example, since the current WQE in the work queue is now an RDMA write WQE, the method proceeds via steps 104 and 108 to a reading step 124. The processing circuitry reads, at step 124, the processed data from the temporary address specified in the RDMA write WQE. At a writing step 128, the processing circuitry transmits the processed data via network interface 52 and over network 26 to the remote target address specified in the RDMA write WQE.

More specifically, the processing circuitry passes the processed data to packet handling circuits 56. These circuits compose the required packet headers, specifying target address 48 and the appropriate source and target QP information, and insert the processed data in the packet payloads. NIC 42 receives the packets and writes the processed data to the specified target address 48 in memory 40. Following step 124 the method loops back to step 100 to receive subsequent WQEs.

As noted above, a combined operation may comprise a chain of WQEs comprising one or more data processing WQEs followed by an RDMA write WQE. For example, the data processing WQEs comprise a WQE specifying a data compression operation followed by a WQE specifying a data encryption operation. In this example, the first data processing WQE specifies the data compression operation and a first temporary address for the compressed data, and the second data processing WQE specifies the encryption operation to be applied to the compressed data, and a second temporary address for the compressed and encrypted data. The RDMA write WQE of the chain specifies the second temporary address as input for the RDMA write operation. The processing circuitry may wait for the execution of one WQE to conclude executing the next WQE in the chain.

The method of FIG. 3 also supports the execution of individual RDMA write WQEs that are not part of any combined operation.

In some embodiments, applying the data processing operation by the acceleration engine is carried out on the fly, as the data is read in from memory 30, to avoid having to buffer a large amount of data in NIC 32.

In some embodiments, the WQEs in the work queue comprise a CQE generation indication, specifying whether or not the NIC should write a CQE to a relevant completion queue. For example, the CQE generation indication is set to "on" for writing a CQE, and to "off" otherwise. In some embodiments, only the last WQE among the multiple WQEs of a combined operation has the CQE generation indication set to "on", so as not to involve the host CPU before executing all of the WQEs of the combined operation, which saves CPU cycles and memory bandwidth.

In the present example, the CQE generation indication of the data processing WQE may be set to "off" and the CQE generation indication of the RDMA write WQE may be set to "on". As such, in response to concluding the transmission at step 128, based on detecting the "on" value of the CQE generation indication of the RDMA write WQE, the NIC notifies the client that the entire combined command has been completed, by writing a CQE to the appropriate completion queue (e.g., CQ 66) in memory 30, for example, as well as raising an interrupt or responding to a polling request if appropriate.

In some embodiments, the NIC receives in the common work queue a second data processing WQE specifying a second data processing operation, after receiving a first data processing WQE and before receiving the RDMA write WQE corresponding to the first data processing WQE. The NIC executes the RDMA write WQE after executing both the first and second data processing WQEs. The second data processing WQE may be linked to the first data processing WQE, by specifying the output buffer of the first data processing WQE as input for applying the second data processing operation. Alternatively, the second data processing WQE is unrelated to the first data processing WQE, and specifies a different source buffer than that of the first data processing WQE.

Figure 4:
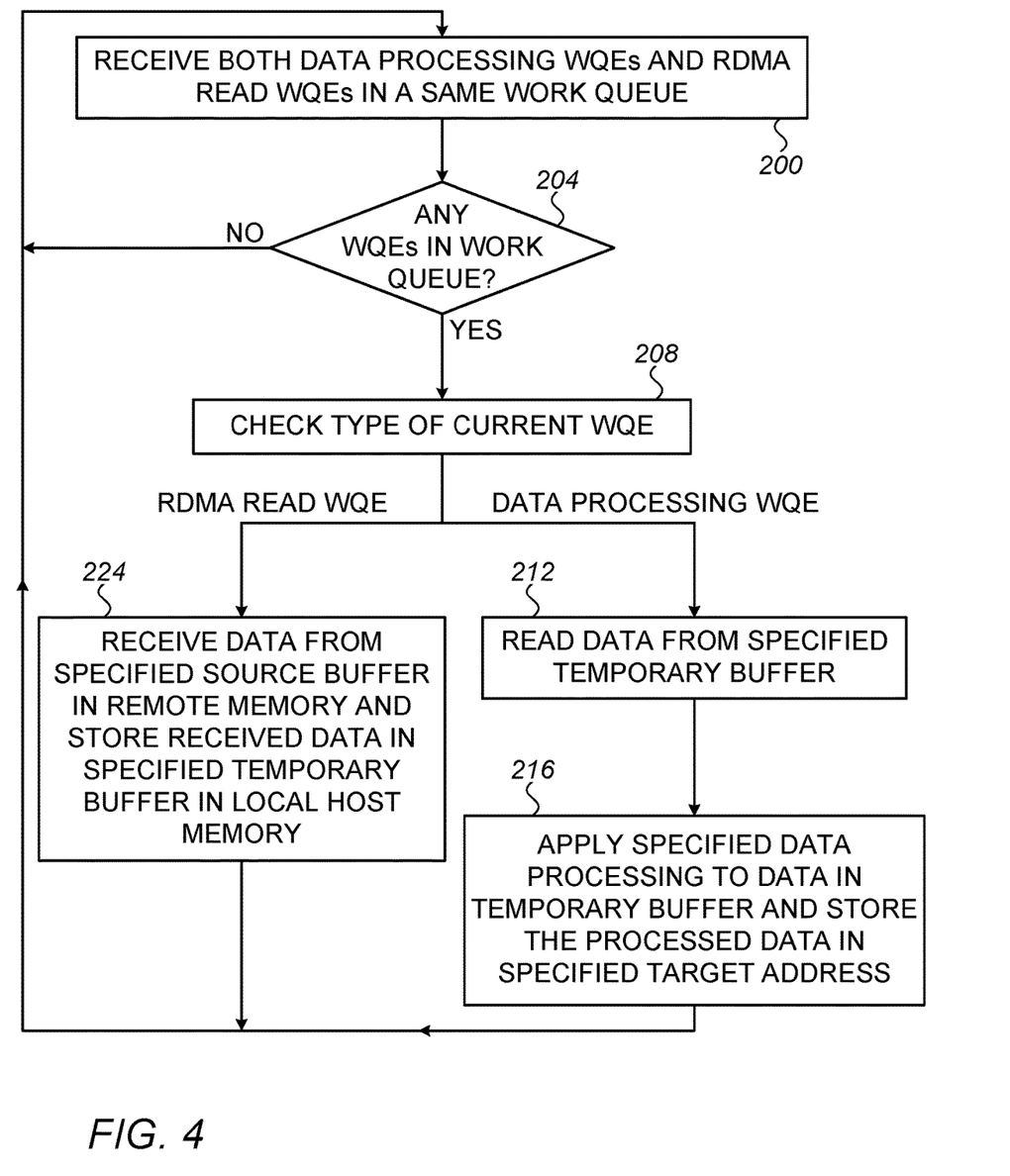
FIG. 4 is a flow chart that schematically illustrates a method for executing data processing and RDMA read requests posted to a common work queue of a NIC, in accordance with an embodiment of the present invention.

FIG. 4 is a flow chart that schematically illustrates a method for executing data processing and RDMA read requests posted to a common work queue of a NIC, in accordance with an embodiment of the present invention. The method is invoked when NIC 32 receives data processing work requests and/or RDMA read work requests, at a command input step 200. The work requests (WQEs) received are posted to a common work queue (e.g., receive work queue 64) by the host CPU.

In an embodiment, the posted WQEs are executed by processing circuitry 54 of the NIC sequentially, in accordance with their order in the work queue. In the present example we assume that the host has posted a combined operation comprising an RDMA read request and by a data processing operation, by posting an RDMA read WQE followed by a corresponding data processing WQE.

The RDMA read WQE specifies a source buffer in remote memory 40, (e.g., target address 48), and a temporary address in local memory 30. The data processing WQE specifies the temporary address in memory 30, the data processing operation to be carried out, and a target address to which the data processed by NIC 32 should be written in memory 30. The data to be processed may be stored in remote memory 40 in a compressed form. In such a case, the data processing operation may comprise a decompression operation.

At a work queue polling step 204, processing circuitry 54 checks whether there are any WQEs in the work queue, and if not, loops back to step 200 to receive WQEs from the host. In alternative embodiments, step 204 is implemented by interrupting the processing circuitry when a WQE is posted to the work queue. When at step 204 the work queue is not empty, the method proceeds to a WQE type checking step 208, for identifying whether the current WQE (e.g., at the head of the work queue) is a data processing WQE or an RDMA read WQE. It is assumed in this example that the combined operation specifies receiving data from target address 48 in remote memory 40 (of host computer 24) in compressed form, and decompressing the received data into buffer 46 of memory 30 (of host computer 22).

It is additionally assumed that the RDMA read WQE was posted to the work queue before the data processing WQE, and is therefore executed first as described below with reference to step 224.

The RDMA read WQE specifies a source buffer in the remote host memory (target address 48) and a temporary buffer in the local host memory. At an RDMA reading step 224, the processing circuitry receives the data to be processed from target address 48 via network interface 50 and over network 26, and stores the received data in the specified temporary buffer in memory 30 of host 22. Following step 224, the method loops back to step 200 to receive subsequent WQEs in the work queue.

In the present example, since the current WQE in the work queue is now the data processing WQE of the combined operation, the method proceeds via steps 204 and 208 to a reading step 212. The data processing WQE specifies the temporary buffer and a target address, both in memory 30.

At step 212, the processing circuitry reads the data from the specified temporary buffer. At a processing step 216, the processing circuitry passes the read data to acceleration engine 58 and configures the accelerator engine to apply the specified data processing operation, and to direct its output to the target address in the memory 30, as specified in the data processing WQE. The accelerator engine thus applies the specified data processing operation and writes the processed data to the target address. In some embodiments, reading the data and processing by the accelerator are carried out as zero-copy operations.

In some embodiments, the processing circuitry waits for the accelerator engine to conclude processing at step 216, before looping back to step 200 to receive subsequent WQEs. In other embodiments, the processing circuitry loops back to step 200 without waiting for concluding the data processing operation by the accelerator engine.

In some embodiments, a combined operation comprises a chain of operations including an RDMA read WQE followed by one or more data processing WQEs. As an example, the data processing WQEs may comprise a data decryption WQE followed by a data decompression WQE. In this example, a first data processing WQE specifies the decryption operation and a temporary address for the decrypted data, and a subsequent data processing WQE specifies the decompression operation and a target address for the decrypted and decompressed data.

The method of FIG. 4 also supports the execution of individual RDMA read WQEs that are not part of any combined operations.

In some embodiments, the methods of FIGS. 3 and 4 can be used for performing a chain of one or more data processing WQEs posted to the common queue. A chain of this sort does not include a remote communication WQE such as read RDMA or write RDMA. In this case, each of the data processing WQEs in the chain specifies a source buffer (input) and a target buffer (output) in the local host memory.

In an embodiment, among the multiple WQEs of a combined operation, in the example of FIG. 4, only the last data processing WQE in the chain, has its CQE generation indication set to "on" so as to signal to the NIC to write a CQE in a relevant completion queue when or after executing this WQE completes. The NIC may notify the client that the entire combined command has been completed by writing a CQE to the appropriate completion queue in memory 40, for example, as well as raising an interrupt or responding to a polling request if appropriate.

In some embodiments, the NIC receives in the common work queue a second data processing WQE specifying a second data processing operation, after receiving an RDMA read WQE and a corresponding first data processing WQE. The NIC executes both the first and second data processing WQEs after executing the RDMA read WQE. The second data processing WQE may be linked to the first data processing WQE, by specifying the output buffer of the first data processing WQE as input for applying the second data processing operation. Alternatively, the second data processing WQE is unrelated to the first data processing WQE and specifies a second source buffer, different from the target address of the first data processing operation.

Other variations on the schemes outlined above will be apparent to those skilled in the art after reading the above description and are considered to be within the scope of the present invention.

Although in the embodiments above accessing information and data processing operations are specified in separate WQEs, this is not mandatory. In general a given WQE may contain accessing information such as source and target addresses, as well as one or more data procession operations.

Accelerator Supporting a Variety of Data Processing Operations

As noted above, acceleration engine 58 of the NIC may support multiple different types data processing operations. A combined operation that comprises a chain of and data processing WQEs may specify a single data processing operation to be applied, or multiple data processing operations to be applied sequentially at a desired order. In addition to the data processing WQEs, the combined operation possibly links the data processing WQEs to an RDMA read WQE or to an RDMA write WQE.

We now give a list of several example data processing operations that can be specified in WQEs of a combined command, for execution by acceleration engine 58, e.g., in implementing the methods described in FIGS. 3 and 4 above. The non-limiting list comprises the following data processing operations:

Encryption—encrypt data in buffer.
Decryption—decrypt data in buffer.
Digital signing of data—calculate a digital signature for the data in buffer.
Data verification using a digital signature—verify that signed data in buffer is valid using the digital signature.
Data compression—apply data compression to data in buffer.
Data decompression—apply data decompression to data in buffer.
Image processing—apply an image processing operation to data in buffer.
Search—match a given regular expression to data in buffer.

Alternatively or additionally, other suitable data processing operations can also be used.

In some embodiments the communicating NICs apply mutually-inverse data processing operations. For example, the sending NIC encrypts plaintext data to produce cipher text data, and sends the cipher text data to the be stored in a remote memory. The NIC of the remote node may be instructed (using suitable WQEs) to decrypt the received cipher text data to recover the original plaintext data. In other embodiments, the peer NICs may apply data processing operations that are not inverse of one another, such as sending data signed with a signature to a remote node that verifies data integrity using the signature.

The acceleration engine may support multiple different methods for a given type of a data processing operation. For example, encrypt and decrypt operations may be based on symmetric-key encryption methods such as the Advanced Encryption Standard (AES), or on asymmetric encryption methods such as the Rivest Shamir Adleman (RSA) method. Digital signature generation and verification methods can be based, for example, on calculating a suitable hash function such as the MD5 hash function. Data compression/decompression may employ, for example, a suitable lossy compression method, or a lossless compression method such as the Lempel-Ziv or Huffman methods. An image processing operation may comprise applying to an image, given in a raw format, an image processing operation such as sharpening or cropping. Alternatively or additionally, the image processing comprises conversion between raw data format and a suitable compression and file format method such as the joint photographic experts group (JPEG) file format.

Although the embodiments described above refer specifically to a NIC, the principles of the present invention may similarly be applied in I/O devices of other types.

The embodiments described above refer mainly to combined operations that include a single remote communication operation. In alternative embodiments, however, a combined operation may include multiple remote communication operations, such as RDMA write and RDMA read for writing data to and reading data from a plurality of remote locations.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A network adapter, comprising:
a network interface, configured to transmit and receive data packets over a network;
a host interface, configured to be connected via a local bus to a host processor and to a local host memory of the host processor; and
processing circuitry, which is coupled between the network interface and the host interface and includes:
packet handling circuits configured to generate outgoing packets; and
an acceleration engine configured to carry out at least one local data processing task, so as to offload data processing tasks from the host processor to the network adapter;
wherein the processing circuitry is configured to:
receive work items in a common work queue, via the host interface;
identify, for each received work item, whether the work item is a data processing work item or a remote communication work item;
in response to identifying the work item received from the common work queue as a data processing work item, read data to be processed from a source buffer in the local host memory, produce processed data by the acceleration engine from the data read, and store the processed data in a target address in the local host memory, and in response to identifying the work item as a remote communication work item, cause the packet handling circuits to generate an outgoing packet, and transmit the generated packet via the network interface over the network.

2. The network adapter according to claim 1, wherein the processing circuitry is configured to execute a next work item only in response to completing execution of a current work item.

3. The network adapter according to claim 2, wherein the processing circuitry is configured to determine whether to execute a next work item only in response to completing execution of the current work item or to start executing the next work item immediately, responsive to a flag in the current work item.

4. The network adapter according to claim 1, wherein the processing circuitry is configured in response to identifying the work item as a RDMA write work item, to cause the packet handling circuits to generate outgoing packets including data from the local memory and transmit the generated packets via the network interface over the network, for storage of the data included in the packets in a remote memory.

5. The network adapter according to claim 1, wherein the processing circuitry is configured in response to identifying the work item as a RDMA read work item, to cause the packet handling circuits to generate an outgoing packet including a request for data from a remote memory, to transmit the generated packet via the network interface over the network, to receive the requested data from the remote memory, via the network interface over the network, and to store the received data in the local memory.

6. The network adapter according to claim 1, wherein the processing circuitry is configured in response to identifying the work item as a data processing work item, to determine from the work item a type of task to be applied to the read data, and to cause the acceleration engine to apply to the determined type of task to the read data.

7. The network adapter according to claim 1, wherein the processing circuitry is configured to cause the acceleration engine to apply data encryption to the read data in response to at least some of the data processing work items.

8. The network adapter according to claim 1, wherein the processing circuitry is configured to cause the acceleration engine to apply data decryption to the read data in response to at least some of the data processing work items.

9. The network adapter according to claim 1, wherein the processing circuitry is configured to cause the acceleration engine to apply digital signing to the read data in response to at least some of the data processing work items.

10. The network adapter according to claim 1, wherein the processing circuitry is configured to cause the acceleration engine to apply data compression to the read data in response to at least some of the data processing work items.

11. The network adapter according to claim 1, wherein the processing circuitry is configured to cause the acceleration engine to apply data decompression to the read data in response to at least some of the data processing work items.

12. The network adapter according to claim 1, wherein the processing circuitry is configured to cause the acceleration engine to apply an image processing operation to the read data in response to at least some of the data processing work items.

13. The network adapter according to claim 1, wherein the processing circuitry is configured to cause the acceleration engine to apply a match operation for a regular expression to the read data in response to at least some of the data processing work items.

14. The network adapter according to claim 1, wherein the processing circuitry is configured to determine whether to write a completion queue element (CQE) to a completion queue upon completion of a task of a work item, responsively to a CQE generation indication in the work item.

15. A method, comprising:
    in a network adapter that transmits and receives data packets over a network, and that connects via a local bus to a host processor and to a local host memory of the host processor, receiving in a common work queue multiple work items including:
        (i) a data processing work item specifying a source buffer in the local host memory, a data processing operation, and a first target address in the local host memory, and
        (ii) an RDMA write work item specifying the first target address and a second target address in a remote memory;
    identifying, for each of the multiple received work items in the common work queue, whether the work item is a data processing work item or an RDMA write work item;
    in response to identifying the data processing work item, reading data to be processed from the specified source buffer in the local host memory, producing processed data by applying the specified data processing operation to the data read, and storing the processed data in the first target address in the local host memory; and
    in response to identifying the RDMA write work item, transmitting the processed data in the first target address in an outgoing packet, over the network, for storage in remote memory.

16. The method according to claim 15, and comprising executing the RDMA write work item only in response to completing execution of the data processing work item.

17. The method according to claim 15, and comprising receiving in the common work queue, a second data processing work item specifying a second data processing operation, before receiving the RDMA write work item, and executing the RDMA write work item after executing both the data processing work item and the second data processing work item.

18. The method according to claim 17, wherein the second data processing work item specifies the first target address as input for applying the second data processing operation, and in response to the second data processing work item, applying the second data processing operation to the processed data in the first target address.

19. The method according to claim 17, wherein the second data processing work item specifies a second source buffer, different from the source buffer, to which to apply the second data processing operation.

20. The method according to claim 15, wherein the data processing operation is selected from a list of operations comprising: data encryption, data decryption, digital signing of data, data verification using a digital signature, data compression, data decompression, an image processing operation, and a match operation for a regular expression.

21. The method according to claim 15, and comprising receiving in the common work queue a sequence of one or more work items specifying respective data processing operations and respective source and target addresses in the local memory, wherein the target address specified in each work item is also specified as the source address in a subsequent work item in the sequence, and performing the data processing operations by orderly executing the work items in the sequence.

22. A method, comprising:
    in a network adapter that transmits and receives data packets over a network, and that connects via a local bus to a host processor and to a local host memory of the host processor, receiving in a common work queue, multiple work items including:
        (i) an RDMA read work item specifying a source buffer in a remote memory and a first target address in the local host memory, and
        (ii) a data processing work item specifying the first target, a data processing operation, and a second target address in the local host memory;
    identifying, for each of the multiple received work items in the common work queue, whether the work item is a data processing work item or an RDMA read work item;
    in response to identifying the RDMA read work item, requesting the data indicated by the RDMA read work item from a network adapter of the remote memory, receiving the indicated data from the source buffer in the remote memory, over the network, and storing the received data in the first target address of the local memory;
    in response to identifying the data processing work item, reading data to be processed from the first target address, producing processed data by applying the specified data processing operation to the data read, and storing the processed data in the second target address in the local host memory.

23. The method according to claim 22, and comprising executing the data processing work item only in response to completing execution of the RDMA read work item.

24. The method according to claim 22, and comprising receiving in the common work queue, a second data processing work item specifying a second data processing operation, after receiving the RDMA read work item, and executing both the data processing work item and the second data processing work item after executing the RDMA read work item.

25. The method according to claim 24, wherein the second data processing work item specifies the second target address as a source buffer for applying the second data processing operation, and wherein, in response to the second data processing work item, applying the second data processing operation to the processed data in the second target address.

26. The method according to claim 24, wherein the second data processing work item specifies a second source buffer, different from the second target address, to which to apply the second data processing operation.

27. The method according to claim 22, wherein the data processing operation is selected from a list of operations comprising: data encryption, data decryption, digital signing of data, data verification using a digital signature, data compression, data decompression, an image processing operation, and a match operation for a regular expression.

* * * * *